United States Patent [19]
Kirkland et al.

[11] Patent Number: 4,874,518
[45] Date of Patent: Oct. 17, 1989

[54] POROUS SILICA MICROSPHERES HAVING A SILANOL ENRICHED SURFACE

[75] Inventors: Joseph J. Kirkland, Wilmington, Del.; Jürgen Köhler, Waltrop, Fed. Rep. of Germany

[73] Assignee: E. I. Du Pont de Nemours and Company, Wilmington, Del.

[21] Appl. No.: 287,650

[22] Filed: Dec. 21, 1988

Related U.S. Application Data

[63] Continuation of Ser. No. 117,430, Nov. 6, 1987, abandoned, which is a continuation of Ser. No. 798,332, Nov. 1, 1985, abandoned.

[51] Int. Cl.⁴ .............................................. B01D 15/08
[52] U.S. Cl. ............................... 210/502.1; 210/198.2; 502/408
[58] Field of Search ................................. 210/656–659, 210/198.2, 502.1; 502/407, 408

[56] References Cited

U.S. PATENT DOCUMENTS

| 3,722,181 | 3/1973 | Kirkland | 210/198.2 |
| 3,782,075 | 1/1974 | Kirkland | 55/67 |
| 3,795,313 | 3/1974 | Kirkland | 210/198.2 |
| 3,857,924 | 12/1974 | Halasz et al. | 423/338 |
| 4,010,242 | 3/1977 | Iler et al. | 423/335 |
| 4,105,426 | 8/1978 | Iler et al. | 65/18 |
| 4,131,542 | 12/1978 | Bergna et al. | 210/31 |
| 4,242,227 | 12/1980 | Nestrick | 210/656 |
| 4,324,689 | 4/1982 | Shah | 210/198.2 |
| 4,477,492 | 10/1984 | Bergna et al. | 427/215 |
| 4,509,964 | 4/1985 | Hubball | 210/198.2 |

FOREIGN PATENT DOCUMENTS 1169701 7/1985 U.S.S.R. .............................. 502/408

OTHER PUBLICATIONS

Snyder and Kirkland, Introduction to Modern Liquid Chromatography, John Wiley & Son, Inc., New York, 1979, pp. 272–278.

Kohlee, "Comprehensive Characterization of Some Silica-Based Stationary Phases for High Performance Liquid Chromatography", Journal of Chromatography, 352 (1986) pp. 275–305.

Primary Examiner—Ernest G. Therkorn

[57] ABSTRACT

Chromatographic materials comprising porous silica microspheres having silanol-enriched and completely silanized surfaces are disclosed. Processes for preparing the specified chromatographic material are also disclosed.

17 Claims, 6 Drawing Sheets

SEPARATION OF TEST MIXTURES A AND B
ON TRIMETHYLSILYL-MODIFIED MICROSPHERES

1 = 5-PHENYLPENTANOL
2 = N,N-DIETHYLANILINE
3 = 2,6-DI-T-BUTYLPYRIDINE
4 = 1-PHENYLHEPTANE
5 = 1-PHENYLHEXANE

SEPARATION OF TEST MIXTURES A AND B
ON TRIMETHYLSILYL-MODIFIED MICROSPHERES

1 = 5-PHENYLPENTANOL
2 = N,N-DIETHYLANILINE
3 = 2,6-DI-T-BUTYLPYRIDINE
4 = 1-PHENYLHEPTANE
5 = 1-PHENYLHEXANE

DEGRADATION OF TRIMETHYLSILYL-MODIFIED SILICAS
(Water Purge - 1.0 ml/min. at 50°)

SEPARATION OF TEST MIXTURE B ON
TRIMETHYLSILYL-MODIFIED MICROSPHERES

1 = 5-PHENYLPENTANOL
2 = N,N-DIETHYLANILINE
3 = 2,6-DI-T-BUTYLPYRIDINE
4 = 1-PHENYLHEPTANE 10 minutes

SEPARATION OF TEST MIXTURE B ON
TRIMETHYLSILYL-MODIFIED MICROSPHERES

1 = 5-PHENYLPENTANOL
2 = N,N-DIETHYLANILINE
3 = 2,6-DI-T-BUTYLPYRIDINE
4 = 1-PHENYLHEPTANE

SEPARATION OF A PEPTIDE MIXTURE
ON TRIMETHYLSILYL-MODIFIED MICROSPHERES

RT IN MINUTES

PRESSURE-STRENGTH TEST FOR POROUS SILICAS

POROUS SILICA MICROSPHERES HAVING A SILANOL ENRICHED SURFACE

This application is a continuation of application Ser. No. 07/117,430 filed Nov. 6, 1987 which in turn is a continuation of Ser. No. 798,332, filed Nov. 1, 1985, both now abandoned.

BACKGROUND OF THE INVENTION

1. Field of the Invention

This invention relates to porous silica microspheres which are useful as chromatographic material.

2. Background of the Art

This invention represents improvements in chromatographic material comprising porous silica microspheres. One improvement resides in an enriched concentration of silanol groups on the surface of crush-resistant microspheres. The higher level of surface silanol groups allows improved silanizations which produce microspheres having enhanced chromatographic properties.

U.S. Pat. No. 3,782,075, issued to Kirkland, discloses an improved packing material for chromatographic columns. The packing material comprises a plurality of uniform-sized porous microspheres having an average diameter of about 0.5 to about 20 $\mu$m. The microspheres consist essentially of a plurality of uniform-sized colloidal particles, having a refractory metal oxide surface arranged in an interconnected three-dimensional lattice. The colloidal particles occupy less than 50% of the volume of the microspheres with the remaining volume being occupied by interconnected pores having a uniform pore size distribution.

U.S. Pat. No. 3,857,924, issued to Halasz et al., discloses a process for the production of spherical, porous silica particles. The process comprises treating an alkali polysilicate solution having a silica content of from about 5 to 7.5 percent by weight batchwise with a cation exchange material to remove cations, and thereafter batchwise with an anion exchange material to remove mineral acids. The treated solution is emulsified and coagulated in a water-immiscible organic medium thereby forming the silica particles. The silica particles are disclosed as having surfaces covered with a certain amount of silanol groups and are used as supports in chromatography, in catalytic processes as catalysts, as carriers for catalytically active materials, and so on.

U.S. Pat. No. 4,131,542, issued to Bergna et al., discloses a process for preparing a low-cost silica packing for chromatography. The process involves spray drying an aqueous silica sol containing from 5 to 60 weight percent silica to form micrograins. These porous silica micrograins are acid-washed and sintered to effect a 5 to 20% loss in surface area.

U.S. Pat. No. 4,477,492, issued to Bergna et al., discloses a process for preparing superficially porous microparticles for use in chromatography and as catalysts or catalyst supports. The process comprises spray-drying a specified well-mixed slurry of core macroparticles, colloidal inorganic microparticles and a liquid. The resulting product is dried and sintered to cause a 5%-30% decrease in surface area.

U.S. Pat. No. 4,010,242, issued to Iler et al., discloses oxide microspheres having a diameter in the 0.5 to 20 $\mu$m range. The microspheres are produced by forming a mixture of urea or melamine and formaldehyde in an aqueous sol containing colloidal oxide particles. Copolymerization of the organic constituents produces coacervation of the organic material into microparticles containing the organic material. The organic constituent can be burned out to form a powder of uniform-sized porous microparticles consisting of an interconnected array of inorganic colloidal particles separated by uniform-sized pores.

U.S. Pat. No. 4,105,426, issued to Iler et al., discloses a powder of discrete, macroporous microspheroids, each having an average diameter in the range of 2 to 50 $\mu$m. Each microspheroid is composed of a plurality of large colloidal particles joined and cemented together at their points of contact by 1 to 10% by weight of nonporous, amorphous silica. The microspheroids have a high degree of mechanical stability and a surface area between about 80 and 110% of that of the large colloidal particles. A process for the manufacture of the powder is also disclosed.

It is known that porous silica microspheres silanized with a uniform coating of organosilyl groups are efficient chromatographic material for separating various types of organic molecules from mixtures. In order to covalently attach these silyl groups, there must be silanol (Si-OH) groups on the silica surface. Another important characteristic for a chromatographic material is crush resistance so that beds of material are stable for use at high pressure. It is known to strengthen porous silica microspheres by heating at about 900° C. After heat strengthening, there are very few silanol groups left on the surface of the silica. Instead, the surface is largely dehydroxylated to siloxane groups (SiOSi) which generally do not react with silanizing agents. A chromatographic material comprising crush-resistant silica microspheres of uniform pore size distribution having a high surface concentration of silanol groups is desirable.

SUMMARY OF THE INVENTION

The present invention provides a chromatographic material comprising improved porous silica microspheres having an average diameter of about 0.5 to about 35 $\mu$m. Substantially all of the microspheres have a diameter ranging from about 0.5 to about 1.5 times the average diameter. The microspheres consists essentially of a plurality of substantially uniform-sized colloidal particles, having a silica surface, arranged in an interconnected three-dimensional lattice. The colloidal particles occupy less than about 50 volume percent of the microspheres. The remaining volume is occupied by interconnected pores having a substantially uniform pore size distribution. The microspheres have a total concentration of silanol groups of from about 6 to about 16 $\mu$mol/m$^2$. In a preferred embodiment, the microspheres are prepared according to a process comprising contacting heat strengthened thermally-dehyroxylated porous silica microspheres having a total concentration of silanol groups of less than about 5.5 $\mu$mol/m$^2$ with water in the presence of HF or at least one basic activator selected from the group consisting of quaternary ammonium hydroxides, ammonium hydroxide, and organic amines at a temperature of from about ambient temperature to about 100° C. for sufficient time to generate the desired concentration of silanol groups.

The invention also provides porous silica microspheres having the specified physical and chemical properties and a completely silanized surface.

DETAILED DESCRIPTION OF THE INVENTION

Figure 1:
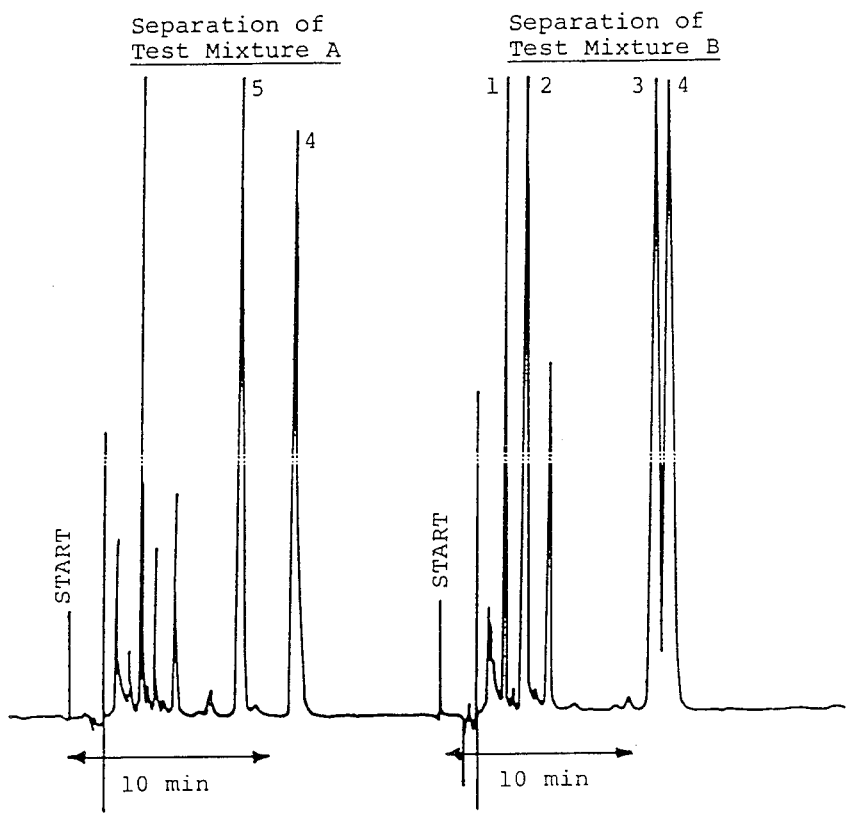
FIG. 1 shows separation of alkylbenzene and polarity test mixtures on porous silica microspheres having a completely silanized surface.

The present invention provides a chromatographic material comprising crush-resistant porous silica microspheres having a silanol-enriched surface which has favorable sorptive properties for separating organic compounds, especially basic compounds. In addition, these silica microspheres permit the preparation of silanized surfaces with enhanced chemical stability with regard to hydrolysis. The invention also provides a chromatographic material comprising crush-resistant porous silica microspheres having a completely silanized surface which are particularly useful for separating basic organic compounds encountered, for example, in biochemical research.

As used herein, the expression chromatographic material means granules capable of forming a packed bed or column having 1) sorptively active surfaces or 2) surfaces capable of being coated with a sorptively active substance to form sorptively active surfaces. A mixture is passed through the bed or column and repeated interactions associated with the chemical nature of components of the mixture and the active surfaces of the chromatographic material cause a separation of the components. The expression "total concentration of silanol groups" refers to the number of moles of silanol groups which are detectable by thermogravimetric analysis (TGA) divided by the surface area of the silica microspheres (i.e. moles silanol groups per m$^2$). It is known that the surface of the silica microspheres can have a maximum concentration of exposed silanol groups of about 8 $\mu$mol/m$^2$. Silanol groups in excess of this maximum concentration are "buried" beneath the surface of the silica. TGA is capable of measuring the sum of exposed surface silanol groups and "buried" silanol groups.

The expression "completely silanized surface" means that the surface of the silica has reached complete equilibrium with organosilyl groups. In this state, the organosilyl groups are tightly packed and form an "umbrella" over unreacted silanol groups. The maximum number of organosilyl groups that can be attached to the surface of silica is limited by steric properties of selected organosilyl groups. It is known that a completely silanized surface of silica with a relatively open structure (e.g. fumed or pyrogenic silica) has a maximum surface concentration of trimethylsilyl groups of from about 4.5 to about 4.7 $\mu$mol/m$^2$. In this case, about 60% of the total silanol groups are available for silanization before steric factors limit the reaction. Larger (bulkier) groups on a completely silanized surface are in lower concentrations. For example, a completely silanized surface of triphenylsilyl groups has a maximum surface concentration of about 1.9 $\mu$mol/m$^2$. Similarly, on compact forms of porous silica, such as the microspheres of the present invention, all of the silanol groups on the silica surface are not available to silanization. For example, a completely silanized surface on porous silica microspheres having a surface area of 440 m$^2$/g and an average pore diameter of 70–80 Angstroms has about 4.0 to about 4.3 $\mu$mol/m$^2$ of trimethylsilyl groups.

The chromatographic material of the present invention comprises porous silica microspheres which have an average diameter of from about 0.5 to about 35 $\mu$m, preferably from about 0.5 to about 20 $\mu$m and most preferably from about 1.0 to about 10 $\mu$m. As used herein, the expression "average diameter" means the statistical average of the spherical diameters of the microspheres. The microspheres are substantially uniform in size which means that less than 5% of the microspheres have a diameter less than about 0.5 times the average diameter and less than 5% have a diameter greater than 1.5 times the average diameter. Preferably, the range is about 0.8 to about 1.2 times the average diameter. Furthermore, the microspheres have controlled pore dimensions and a relatively large pore volume.

The porous silica microspheres consist essentially of a plurality of substantially uniform-sized colloidal particles. The particles have a silica surface and are arranged in an interconnected three-dimensional lattice that occupies less than about 50 volume percent of the microspheres. The remainder of the microspheres is comprised of substantially uniform-sized pores. The size of the pores contained in the microspheres will depend on the size of the colloidal particles.

The average diameter of the pores in the microspheres of the present invention, at a pore diameter of about 1,000 Angstroms, is about half the calculated diameter of the ultimate spherical particles making up the microspheres. This diameter is calculated from the following equation:

$$D = 6000/DA$$

where D is the calculated diameter of the ultimate particle, d is the density of the solid inorganic material (e.g., 2.2 grams per cm$^3$ for amorphous SiO$_2$) and A is the specific surface area of the microspheres, determined by nitrogen adsorption, as disclosed in Nelson et al., *Analytical Chemistry*, 30: 1387 (1958). At about 100 Angstroms, the pore diameter is about equal to the colloidal ultimate particle diameters and at about 50 Angstroms it is about one and a half times the colloidal particle diameter.

Porous silica microspheres of the present invention have a total concentration of silanol groups of from about 6 to about 16 $\mu$mol/m$^2$, preferably from about 8 to about 16 $\mu$mol/m$^2$. These microspheres can be prepared by contacting heat-strengthened thermally-dehydroxylated porous silica microspheres having a total concentration of silanol groups of less than about 5.5 $\mu$mol/m$^2$ with water in the presence of HF or a basic activator. The silanol-enriched microspheres provide a chromatographic material which exhibits high hydrolytic stability and a low adsorption of basic compounds. The silanol-enriched microspheres can be contacted with a silanizing agent to form crush resistant microspheres having a completely silanized surface. The silanized microspheres exhibit enhanced chemical stability with respect to hydrolysis.

Microspheres of the present invention demonstrate high mechanical stability when used in columns for high pressure liquid chromatography. It is believed that the stability results from a portion of the silica being dissolved by water containing HF or a basic activator. The resulting silica is reprecipitated at points of contact between the colloidal particles making up the aggregate structure of the porous silica microspheres. Thus, the reprecipitated silica provides additional reinforcement to the structure of the silica microspheres.

I. Heat Strengthened Thermally-Dehydroxylated Porous Silica Microspheres

Heat strengthened thermally-dehydroxylated porous silica microspheres can be prepared according to a method similar to that described in U.S. Patent 3,782,075, the disclosure of which is incorporated herein by reference. An aqueous sol of silica is formed and mixed with a copolymerizable mixture of urea and formaldehyde or melamine and formaldehyde. Polymerization is initiated and coacervation of the organic material into microspheres containing the colloidal particles occurs. The microspheres are then solidified, collected, washed and dried. At this stage, the microspheres consist of a plurality of colloidal particles embedded in a sphere filled with polymer. The organic material is then burned off at a temperature sufficient to oxidize the organic constituents without melting the inorganic material. Generally, the organic material is burned off at about 550° C. The porous microspheres are then sintered at an elevated temperature for a time sufficient to strengthen the microparticles to the point where they will not fracture in use. A good indication of whether enough sintering has occurred is when the specific surface area of the microspheres has been reduced to a value which is at least 10% less than the surface area of the colloidal particles themselves.

Formation of the microspheres proceeds by association of the inorganic colloidal particles with the organic coacervate. It is postulated that the extreme uniformity in both the size of the microspheres and the distribution of the colloidal particles within the microspheres depend on an interaction between hydroxyl groups on the surface of the colloidal particles and portions of the organic polymer chains. For this reason, at least prior to the onset of polymerization, the colloidal particles must have hydroxyl groups on their surface equivalent to a hydrated oxide surface.

The ultimate particles of the present invention must be colloidal in size. This means that at least two of the dimensions of these particles will be in the range of 3 to 500 nm and the other dimension will be in the range of 3 to 1000 nm. Particles having one dimension greater than a $\mu$m or having any dimension greater than about 0.1 times the diameter of the microspheres are difficult to incorporate into spherical microparticles since the large dimension interferes with the formation of discrete spherical units.

The organic components used to form the microspheres must be initially soluble in water and miscible with the silica colloid without flocculating or dissolving it at the pH at which the reaction occurs. The polymer when formed must be insoluble in water. While a variety of organic materials are suitable, it appears that the highest degree of uniformity in both particles size and pore size distribution occurs when a copolymerizing mixture of urea and formaldehyde or melamine and formaldehyde is used. Urea and formaldehyde in molar ratio of about 1 to 1.2 or 1.5 and a pH or about 1.0 to 4.5, and melamine and formaldehyde in molar ratio of about 1 to 3 and a pH or about 4 to 6 are suitable.

The ratio of organic material to silica should be such that after polymerization, the precipitated particles contain about 10 to 90 weight percent of silica. Expressed in terms of volume, the percent volume of inorganic material should range from about 10 to about 50. To obtain coherent porous spheres after the organic matter is burned out, there must be a sufficiently high concentration of silica particles within the matrix to link together into a three-dimensional matrix. This network may be very fragile, when obtained at 550° C., but if heated undisturbed at higher temperature to initiate sintering, the porous microspheres develop strength. To insure that sufficient sintering has occurred to provide the desired strength, the particles are generally sintered at a temperature, usually above 900° C., which is sufficiently high to reduce the specific surface area of the particle by at least 10% below the value for the colloidal particles from which they are formed. The microspheres have uniform pores, the diameters of which depend on the size of the colloidal particles used in their preparation and the volume ratio of the organic polymer to the silica material used. The larger the colloidal particles, the larger the pores between them, and the greater the proportional volume of organic polymer in the microspheres when formed, the more open the network of silica particles and the wider the pores.

Calcining porous silica microspheres has two effects. First, the ultimate particles making up the porous structure sinter or fuse together to some extent at their points of contact to increase the physical strength of the microspheres. Second, the hydroxylated surface of silanol groups present before being heated is dehydroxylated, i.e., water is lost by condensation of neighboring SiOH groups, generally leaving most of the surface consisting of siloxane groups, SiOSi. Generally, these siloxane groups are inert to reaction with silanizing agent. It has been found that the resulting microspheres have a total concentration of silanol groups of substantially less than about 5.5 $\mu$mol/m$^2$. It has been found that the microspheres can be rehydroxylated to provide an improved chromatographic material and a good precursor for subsequent reaction with silanizing agents.

Methods that have been used to rehydroxylate silica surfaces include boiling the calcined silica particles in water for extended periods of time or in dilute nitric acid for several hours. Under these conditions, some rehydroxylation occurs and typically there are then about three silanol (SiOH) groups on the surface per square nanometer, or about 5 $\mu$mol/m$^2$. This has been the practical limit of these processes and is characteristic of commercially available calcined/rehydroxylated silica column packings. Another known method of rehydroxylation involved hydrothermal treatment with steam. This aggressive technique significantly degrades the porous structure of the silica particles and leaves a surface that is poorly suited for chromatography.

II. Porous Silica Microspheres Having an Enriched Surface Concentration of Silanol Groups The porous silica microspheres having a total concentration of silanol groups of from about 6 to about 16

$\mu$mol/m$^2$ can be prepared by contacting heat strengthened thermally-dehydroxylated porous silica microspheres with water in the presence of HF or at least one basic activator selected from the group consisting of quaternary ammonium hydroxides, ammonium hydroxide, and organic amines. The contacting normally is conducted at a temperature of from about 25° C. to about 100° C. for sufficient time to generate the desired surface concentration of silanol groups. The strength characteristics of the resulting microspheres are superior to those of the heat-strengthened microspheres described in Section I above. The strength is derived from the inherent integrity of the silica particles based on the optimum ratio of pore volume to silica volume, the calcination pretreatment, and the addition of silica at the contact point of the colloidal particles comprising the microspheres during the rehydroxylation process.

The concentration of silanol groups on a silica surface can be determined in several ways including infrared spectroscopy, solid-state magic angle spinning nuclear magnetic resonance, proton-spin counting NMR, and/or thermogravimetric analysis, the latter generally being preferred because of its simplicity and precision. It is noted in this connection that excessive rehydroxylation of a silica surface to greater than about 8 $\mu$mol/m$^2$ of silanol groups will result in silanol groups that are "buried" beneath the silica surface. These groups are detected by TGA, but generally are not available for chromatographic interactions or for reactions with silanizing agents to form bonded-phase packings.

It has been found that activators which promote rehydroxylation to the desired total concentration of silanol groups of from about 6 to about 16 $\mu$mol/m$^2$ are HF and basic activators selected from the group consisting of quaternary ammonium hydroxides, ammonium hydroxide, and organic amines. Preferably, the basic activator is selected from the group consisting of tetraalkylammonium hydroxide, ammonium hydroxides, primary organic amines and secondary organic amines. The relative rate of dissolution of silica by a basic activator can be controlled by maintaining pH in the weakly-basic range. Most primary and secondary organic bases rapidly dissolve silica above a pH of about 10.5. The rate is much slower below this pH value. A basic activator that provides a buffered pH of about 10.5 in dilute solution has desirable properties, especially when hydroxylation is carried out at 25°–50° C. At these temperatures the solubility and the rate of transfer of silica is much lower than at higher temperatures such as 100° C. Preferably, a basic activator is added in a sufficient amount to generate a pH of from about 9 to about 10.5.

For basic activators the overall rate of attack on the silica surface generally decreases from methyl to ethyl to propyl. For example, normal ethyl-, propyl-, and butylamine, secondary ethyl-propyl- and butylamine are effective activators. Monomethyl- and dimethylamine can be utilized, if care is exercised. Steric effects appear to have a noticeable influence on the dissolution rate of the silica gel latice as disclosed by A. Wehrli, J. C. Hildenbrand, H. P. Keller, R. Stampfli, R. W. Frei, *J. Chromatogr.*, 149:199 (1978). Methyl amines can be less practical because of their strong tendency to attack silica. Thus, methyl amines are more difficult to control in generating the desired concentration of silanol groups. It has been found that the rate of attack of a base on silica is dependent on the strength (pK$_B$ value), concentration, and geometry of a selected basic activator.

Although tetraalkylammonium hydroxides show strong aggressiveness for dissolving silica, these compounds are preferred basic activators for rehydroxylation. This is the case even though tetramethylammonium, tetrapropylammonium and tetrabutylammonium hydroxide show equal or an even greater tendency than alkali hydroxides to attack the silica surface. Tetraalkylammonium hydroxides are effective activators because at a pH of from about 9 to about 10.5, very little of the free base remains in solution. It is believed that most of the base is absorbed as a monolayer on the silica surface, making the silica somewhat hydrophobic. Hydroxyl ions remaining in solution catalyze the breaking of siloxane groups, while the monolayer of activator on the silica surface retards dissolution and deposition of silica. Therefore, the process can be conveniently interrupted before the degree of hydroxylation passes beyond the desired range.

Tetrabutylammonium hydroxides, ammonium hydroxide and primary organic amines are preferred basic activators. When a sufficient amount of these bases is added to an aqueous suspension of microspheres to raise the pH to a value between 9 and 10.5, very little free base remains in solution. Most of the base is adsorbed as a monolayer on the silica surface making the silica surface somewhat hydrophobic. Hydroxyl ions remaining in solution catalyze the breaking of siloxane groups while the monolayer of activator on the silica surface retards dissolution and deposition of silica. This process can be stopped before rehydroxylation of the microspheres passes beyond the desired concentration of silanol groups. Most preferably, the primary and secondary amines contain hydrocarbon groups that retard dissolution of silica.

Ammonium hydroxide is also a preferred basic activator. Dilute ammonium hydroxide at pH 10 reacted with silica for 18 hours and 25° C. is a preferred method for rehydroxylating a silica surface to the desired concentration of silanol groups. Hydrolysis of a 440 m$^2$/g silica by this procedure changed the surface area by only about 25%, and the pore volume of the silica remained essentially unchanged.

Most preferably, the basic activator is at least one primary amine selected from the group consisting of ethylenediamine, n-propylamine and n-butylamine. These amines can generate a pH of from about 9 to about 10.5. A pH in this range accelerates rehydroxylation of the silica surface, without significant change in the surface area and pore diameter of the silica structure as can occur with strong organic bases such as quaternary ammonium hydroxides. When the latter are used as activators, their concentration should be low and the initial pH should not exceed about 10. Secondary amines such as diethyl-, dipropyl-, and dibutylamine are also suitable activators but rehydroxylation reactions are generally slower. Tertiary amines are less preferred activators.

Alkali- or alkaline-earth hydroxides such as NaOH, KOH and CaOH are difficult to control in the rehydroxylation process. Use of these agents can result in significant undesirable changes in the pore structure and surface area of the starting silica. In addition, use of these agents results in an undesired contamination of the starting silica with the cation from the hydroxide. This contamination causes deleterious effects with the silica support in subsequent chromatographic uses.

Acidic solutions of ionic fluorides are also suitable activators. Suitable sources of HF are HF, NH$_4$F and other ionic fluorides not containing a metal or metalloid cation which could deleteriously contaminate the highly purified silica. These activators can be added to an aqueous solution containing thermally dehydroxylated microspheres according to the following procedures. The aqueous solution is adjusted to a pH of about two to about four with a mineral acid such as hydrofluoric, hydrochloric or sulfuric acid. A suitable source of free HF is added to the solution in a concentration that acts as a catalytic agent for the dissolution of the silica surface. The preferred concentration of HF is a function of the surface area of the silica. Preferably, microspheres of the present invention are rehydroxylated in the presence of free HF in a concentration of from about 50 to about 400 ppm. Typically, HF in a concentration of from about 200 to about 400 ppm is suitable to activate the rehydroxylation of a 300–400 m$^2$/g silica. It is believed that fluoride, introduced as HF or an ionic salt thereof at a pH from about 2 to about 4, reacts with a small amount of dissolved silica to form $SiF_6^{-2}$. The $SiF_6^{-2}$ remains in equilibrium with a low concentration of HF. This system functions as an activator to increase the rate of silica hydroxylation.

III. Silanized Porous Silica Microspheres

Porous silica microspheres having a completely silanized surface can be prepared from the microspheres having a total concentration of silanol groups of from about 6 to about 16 μmol/m$^2$. The microspheres having an enriched surface concentration of silanol groups prepared in Section II, above, are contacted with a silanizing agent at a temperature of from about 25° to about 100° C. for sufficient time to generate a completely silanized surface. Suitable silanizing agents are disclosed above and known in the art. A partial list of suitable silyl groups includes trimethyl-, dimethylbenzyl-, dimethylbutyl-, dimethyloctyl-, dimethyloctadecyl, dimethyl-3-cyanopropyl-, dimethyl-3-glycidoxylpropyl-, and methyldiphenylsilyl. Other suitable silanizing agents are disclosed in U.S. Pat. Nos. 3,722,181 and 3,795,313, the disclosure of which are incorporated herein by reference.

UTILITY

In optimum dimensions, microspheres of the present invention exhibits superior performance in various forms of liquid chromatographic applications including bonded-phase, liquid-solid and size-exclusion. For example, highly efficient liquid-solid chromatography can be carried out with microspheres having a diameter in the 1.0 to 15.0 μm range made from colloidal particles in the 5 to 50 nm range. High speed bonded-phase packings can be prepared by coating microspheres having a diameter in the 1.0 to 15.0 μm range and made from colloidal particles in the 50 to 100 nm range, with appropriate covalently bonded organic ligands or with polymerized coatings. These particles can also be reacted with ion-exchange media to produce supports for ion-exchange chromatography. Highly efficient gas-liquid and gas-solid chromatographic separation also can be carried out with microspheres having a diameter in the range of 20 to 30 μm, made from colloidal microparticles in the 5 to 200 nm range. The range of useful microsphere diameters extends from about 0.5 to 35 μm.

Since the microspheres prepared from each size of colloidal particles consists of a totally porous structure having a narrow range of pore sizes, by varying the size of the colloidal particles, microspheres having a predetermined range of relatively homogeneous pore sizes can be produced. Silica microspheres with pores of known dimension can be used for high speed size-exclusion chromatographic separation such as gel permeation and gel filtration. These separation techniques are based on the differential migration of molecules based on molecular size or molecular weight considerations. Small particle size promotes rapid mass transfer so that mobile phase velocities much higher than normal can be used while still maintaining equilibrium in the diffusion-controlled interaction that takes place within the pores in the totally porous structure. The strong, rigid characteristics of the present microspheres permit their use at very high pressures without particle degradation or deformation. The spherical nature of the particles permits the packing of columns with a large number of theoretical plates, which is of particular importance in the separation of large molecules. Of prime consideration in the size-exclusion chromatographic process is the internal volume of the particles used in the separation. Pore volume of the particles is moderately high in the microspheres, usually from 50 to 65% (measured by N$_2$ adsorption with the B.E.T. method) which is comparable to that found for the porous glasses and the porous organic gels widely used for size-exclusion chromatography.

The silica microspheres are also useful in gel filtration separations in aqueous systems and for the separation of small polar molecules. Microspheres having pores in the 50 to 2500 Angstroms range permit the high-speed size-exclusion chromatographic separation of a large variety of compounds in both aqueous and nonaqueous systems.

One of the factors that affects efficiency is the nature of packing formed in a column or structure which constitutes the resolving zone. One advantage of the microspheres of the present invention is that their high mechanical strength and spherical and uniform size permits ease of packing into a dense bed. A common column packing method is dry packing. However, when the particles are less than about 20 μm in diameter, high-pressure wet-slurry packing must be used. The uniform porous silica microspheres of this invention can be easily and conveniently high-pressure slurry-packed into columns after producing a stable suspension. The suspension of particles is accomplished by techniques described in L. R. Snyder and J. J. Kirkland, "Introduction to Modern Liquid Chromatography", Second Edition, John Wiley and Sons, Inc. 1979, p. 207. Chromatographic columns herein described were prepared from such slurries according to a procedure similar to that described by L. R. Snyder and J. J. Kirkland, at p. 210.

The porous silica microspheres of the present invention demonstrate higher permeability (less resistance to flow) than irregularly-shaped and wider size range silica particles of the same size. Pressure requirements for microsphere columns are sufficiently low so as to be handled by most of the pumps currently being used in liquid chromatography. One-meter long microsphere columns of 5 to 6 μm particles can be operated at carrier velocities of 0.5 cm/sec with pressures of only about 2400 psi (16.56 kPa). Such a column would exhibit >60,000 theoretical plates, which should permit very difficult separations.

The present invention is further described by the following examples wherein all parts and percentages are by weight and degrees are Celsius. In the Examples, pH measurements of silica suspensions were carried out with a Beckman 43 pH-METER equipped with automatic temperature compensation and a Beckman refillable combination electrode. The electrode was calibrated with pH 4, pH 7 and pH 10 standard solutions, depending on the pH range investigated. The silica suspensions were prepared by adding 50 g of deionized water to 1 g of silica. After stirring for 2 minutes, the pH value of the suspension and the time of measurement were recorded. The pH values were determined after at least 10 minutes of equilibration. Thermogravimetric analysis and chromatographic results shown in the Examples were conducted according to the following procedures.

Thermogravimetric Analysis

TGA-measurements were conducted with a Model 990 TGA-analyzer (E. I. du Pont de Nemours & Company, Wilmington, DE) according to the following procedure. 20 to 100 mg of silica were loaded into a small quartz crucible and placed in the TGA-analyzer. The resulting samples were heated to 120° at a rate of 10°/min while dry nitrogen gas was passed through the heating chamber at a flow rate of 50 mL/min to remove physically adsorbed water from the silica surface. The samples were maintained at 120° until no further weight loss could be observed. The temperature was then increased to 300° at the same heating rate as before, and held at this temperature until a constant weight was reached. The same procedure was repeated at 500°, 700°, 900°, 1050°, and 1200°. At each temperature, a characteristic weight loss could be observed for each sample.

The total concentration of silanol groups on the silica was calculated from the total percent weight loss found at 1200° following the drying step at 120° C. The calculation of SiOH concentation was based on the assumption that two moles of SiOH groups combine on heating to form one mole of water which is lost from the sample during the heating procedure. The total concentration of silanol groups on the silica was calculated according to the following formula:

$$\mu mol/m^2 \text{ SiOH} = \frac{W \times 1111.1}{SA},$$

where W is the percent weight loss difference at equilibrium from heating at 120° to the heating at 1200°, and SA is the BET nitrogen surface area of the silica in $m^2/g$.

A relatively pure silica sample begins to soften above 1000°. Significant weight loss can be detected after 1 hour of heating at temperatures greater than 1000° with some samples. To ensure that this observation was not due to an artifact (e.g., formation of silica nitride), experiments were repeated with argon as the purging gas. No differences in the TGA-curves could be detected. Thus, the weight loss upon heating is due to the loss of chemically bonded water from the silica structure.

Control experiments (no sample) showed no apparent weight loss at temperatures above 1000°, indicating no significant response due to buoyancy effects at these high temperatures. Also, the observed weight loss at about 1000° is not due to desorption of gas during the sintering of the silica, since BET (Brunauer, Emmett and Teller) measurements revealed that only extremely small amounts of gases are adsorbed on the silica at high temperatures (e.g., 380°).

Chromatographic Procedures

Stainless steel column blanks, 150 mm long and 4.6 mm inner diameter with mirror-finished walls were used. Low dead-volume stainless steel compression fittings with metal screens retained the packing. For a single column, 2 to 3 g of silica was suspended in 14 mL of hexafluoroisopropanol slurrying liquid. Hexane was used as pressurizing liquid at 10,000 psig (69.0 kPa). Columns were packed according to a method similar to that described in, L.R. Snyder and J. J. Kirkland, "Introduction to Modern Liquid Chromatography", 2nd edition, John Wiley & Sons, New York, 1979, Chapter 5. Prior to chromatographic testing, columns were carefully purged with isopropanol and methanol.

Chromatographic experiments were performed with a Du Pont 8800 LC instrument equipped with column oven, Rheodyne injection valve and a Du Pont 860 Absorbance Detector or Du Pont 862 UV Spectrophotometer Detector. Solvent containers were stored in well-ventilated areas, and all mobile phases were carefully degassed by helium purge before use. All columns were thermostated at 50°. In the Examples, the following test-mixtures were used:

(1) Test Mixture A contained 10 $\mu$L of 1-phenylheptane + 10 $\mu$L of 1-phenylhexane in 4 ml of methanol.
(2) Test Mixture B contained 25 $\mu$L of a polarity mixture in 4 ml of methanol. The polarity mixture contained 250 $\mu$L of 5-phenylpentanol, 10 $\mu$L of N,N-diethylaniline, 50 $\mu$L of 2,6-di-t-butylpyridine and 1000 $\mu$L of 1-phenylheptane.

Injections of 5 to 10 $\mu$L were used to produce chromatographic peaks on a 1 mV recorder at 254 nm detection wavelength and an attenuation of 0.05.

New columns were first tested with Test Mixtures A and B using methanol/water eluents (80/20, 70/30 or 60/40). Retention times, k'-values and column plate counts for the different peaks were determined for each chromatogram. The relative retention or selectivity factor of the basic probe, N,N-diethylaniline, to the neutral compound, 1-phenylheptane (capacity factor $k_1'/k_2'$ ratio) was used to indicate the adsorptivity of column packings.

EXAMPLE 1

Preparation of Porous Silica Microspheres Having a Silanol-Enriched Surface 13 g of heat strengthened thermally-dehydroxylated porous silica microspheres having a surface area of 443 $m^2/g$, an average pore diameter of 77 Angstroms and a total silanol concentration of no more than 5.9 $\mu mol/m^2$, which are available commercially from E. I. du Pont de Nemours and Company under the registered trademark Zorbax-PSM-60 (5$\mu$m), were heated at 850° for 3 days. The resulting silica was placed into a 250 mL 3-neck pyrex flask equipped with a reflux condenser and heater-stirrer and suspended in 130 mL of water containing 200 ppm of HF (400×10$^{-6}$ liter of a 50% HF-solution in 1 L of deionized water). The pH-value of the resulting suspension was 3. The suspension was boiled for 3 days, allowed to cool in the reaction flask to ambient temperature, and then filtered using an extrafine fritted disk. The resulting filtrate exhibited a pH-value of 3. By washing the silica with 2000 mL of deionized water the pH-value of the filtrate was increased to 6. The silica was rinsed with acetone and dried at 120° and 0.1 mbar (0.01 kPa) for 15 hours. The silica was then rinsed successively with 300 mL of a water/ammonium hydroxide-solution (pH=9), water to neutrality, and 100 mL of acetone and dried at 0.1 mbar and 120° for 15 hours. 1 g of the resulting silica suspended in 50 g of water exhibited a pH-value of 5.3 as compared to a pH value of 4.1 for the starting silica. The rehydroxylated silica had a surface area of 347 m²/g, an average pore diameter of 80 Angstroms and a total silanol concentration of 9.0 μmol/m² by TGA.

EXAMPLE 2

Preparation of Porous Silica Microspheres Having a Silanol-Enriched Surface 13.5 g of the silica starting material described in Example 1 were heated at 850° for 3 days. The resulting silica was placed into an apparatus similar to that described in Example 1 and suspended in 200 mL of deionized water. The resulting suspension was adjusted to a pH value of 9 with tetrabutylammonium hydroxide solution. The resulting suspension was then heated to 100° for 26 hours, allowed to cool to ambient temperature, and filtered using an extra-fine fritted disk. The resulting silica was washed to neutrality with 1000 mL of water. The resulting silica powder was then rinsed with 300 mL of acetone and dried for about 18 hours in a vacuum oven at 120° and 0.1 mbar (0.01 kPa). 1 g of resulting silica suspended in 50 g of water showed a pH-value of 5.6 after 10 minutes. To ensure that no tetrabutylammonium ion was adsorbed to the surface, the silica was washed with 200 mL of diluted nitric acid (1 mL of concentrated $HNO_3$ in 200 mL of water) and another 1000 mL of deionized water to neutrality. After washing with 300 mL of acetone and repeating the drying procedure, the pH-value of the silica was measured again. No change of the original pH-value of 5.6 was observed. The resulting silica had a surface area of 356 m²/g, an average pore diameter of 87 Angstroms, and a total silanol surface concentration of 9.1 μmol/m² by TGA.

EXAMPLE 3

Preparation of Porous Silica Microspheres Having a Silanol-Enriched Surface 15 g of the silica starting material described in Example 1 were heated at 850° for 3 days. The resulting silica was placed into an apparatus similar to that described in Example 1 and suspended in 150 mL of deionized water. The resulting suspension was adjusted to pH 9 by the addition of ethylenediamine. The suspension was heated at reflux for 24 hours, allowed to cool to ambient temperature, and filtered using an extra-fine fritted disk. Refluxing was performed under an argon atmosphere to avoid a reaction of ethylenediamine with carbon dioxide. The resulting sample was washed in nitric acid, deionized water, and acetone according to a method similar to that described in Example 2. 1 g of the resulting silica suspended in 50 g of water exhibited a pH-value of 5.3. The silica had a surface area of 224 m²/g, an average pore diameter of 142 Angstroms, and a total silanol concentration of 9.9 μmol/m² by TGA.

EXAMPLE 4

Preparation of Porous Silica Microspheres Having a Silanol-Enriched Surface 15 g of the silica starting material described in Example 1 were suspended in distilled water and the resulting mixture was adjusted to a pH of 10 with ammonium hydroxide. The mixture was allowed to stand for 18 hours at room temperature and filtered. The resulting sample was washed with 500 mL of distilled water, 200 mL of nitric acid (1 mL of concentrated nitric acid in 200 mL of water), and 500 mL of distilled water to neutrality. The sample was washed with 200 mL of acetone, air-dried, and then dried in a vacuum oven at 100° for 16 hours. The resulting hydroxylated silica exhibited a pH value of 4.8, a nitrogen surface area of 381 and 387 m²/g (duplicate analysis) and an average pore diameter of 76 and 80 Angstroms (duplicate analysis) as compared to the starting silica which exhibited a pH value of 4.1, surface area of 443 m²/g and an average pore diameter of 77 Angstroms. Thermogravimetric analysis of the hydroxylated silica showed a total silanol concentration of 8.9 μmol/m² by TGA.

EXAMPLE 5

Preparation of Wide-Pore Silica Microspheres Having a Silanol-Enriched Surface 15 g of heat strenghthened thermally-dehydroxylated microspheres, which are available commercially from E. I. du Pont de Nemours and Company under the registered trademark Zorbax-PSM-300, were placed in a quartz dish and heated in a nitrogen-purged furnace at 200° for 8 hours, at 400° for 15 hours, and at 850° for 3 days. The resulting initial sample exhibited a nitrogen surface of 56 m²/g and an average pore diameter of 442 Angstroms by nitrogen adsorption and 338 Angstroms by mercury intrusion. The sample was placed into a 250 mL three-neck glass flask equipped with a reflux condenser and a heater-stirrer, and suspended in 150 mL of water containing 75 ppm of HF. The resulting mixture was boiled for 3 days, allowed to cool in the reaction flask to ambient temperature, and filtered using an extra-fine fritted disk. The resulting solid was washed with water to neutrality (about 600 mL) and heated at 100° in distilled water for 10 hours. The resulting mixture was filtered and the resulting solid was washed with 200 mL of acetone and dried at 120° and 0.1 mbar (0.01 kPa) for 15 hours. The resulting silica had a nitrogen surface area of 57 m²/g, an average pore diameter of 289 Angstroms by nitrogen adsorption and a total silanol concentration of 15.6 μmol/m² by TGA, as compared to the starting silica which exhibited a total silanol concentration of 5.8 μmol/m².

EXAMPLE 6

Preparation of Porous Silica Microspheres Having a Silanized Surface

This Example was carried out in an Edwards high vacuum system and a silylation apparatus similar to that described in A. Haas et al., *Chromatographia*, 14:341 (1981) and G. Schomburg et al., *Chromatog. J.*, 282:27 (1983), the disclosures of which are incorporated herein by reference. 15 g of the porous silica microspheres having a silanol-enriched surface prepared in Example 1 were dried in the reaction chamber of the silylation apparatus at 200° and $2\times10^{-6}$ mbar for 24 hours and allowed to cool to ambient temperature. 30 mL of trimethylsilylenolate were placed in a dropping funnel, under an argon atmosphere. The funnel was evacuated, and the enolate allowed to come into direct contact with the silica. As the reaction proceeded, bubbles of acetylacetone were released. After 1 hour, the silica was heated to 60° for another 4 hours. The resulting product was washed with 200 mL portions of dry toluene, dichloromethane, methanol, methanol-water (1:1), and acetone, successively. This procedure produced a trimethylsilyl concentration of 4.0 $\mu$mol/m$^2$ as determined by elemental analysis. The silica was tested as a chromatographic material using Test Mixture A and Test Mixture B, previously described herein. The tests were conducted using a methanol/water eluent (70/30), a flow rate of 1 mL/min and a pressure of 725 psi (5000 kPa). The results of these separations are shown in FIG. 1.

Figure 2:
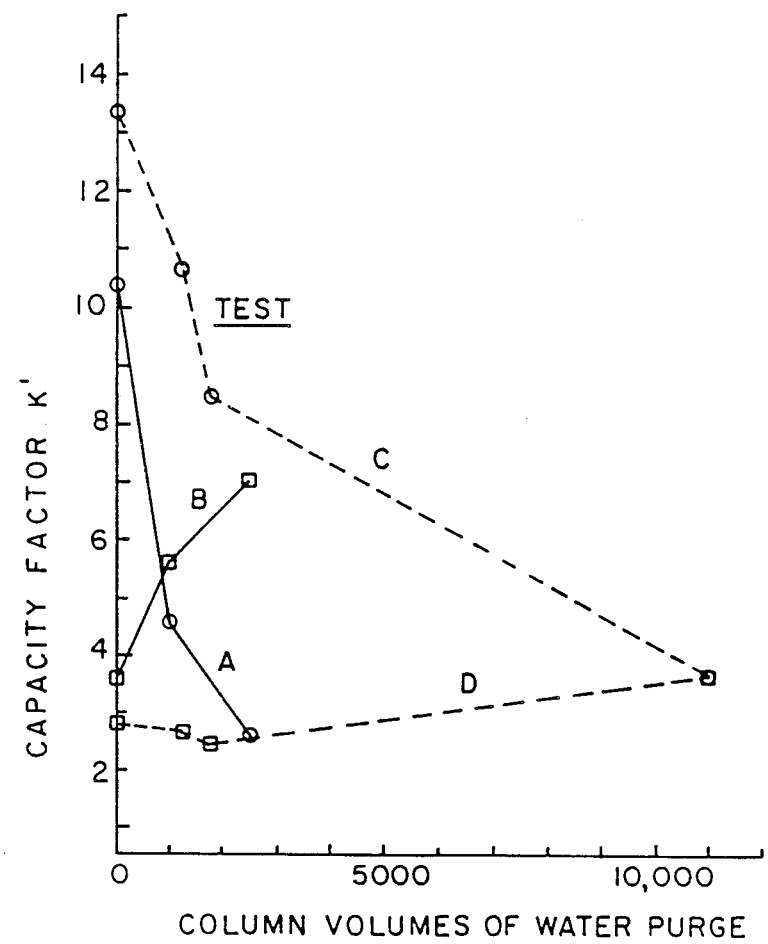
FIG. 2 shows degradation of porous silica microspheres having a completely silanized surface.

The stability of the trimethylsilyl-modified rehydroxylated microspheres prepared in this Example was compared to that of the starting microspheres described in Example 1. In these tests degradation of the trimethylsilyl-modified silica was initiated by purging columns of the chromatographic materials with water. Periodically during this purging, these columns were tested chromatographically with the test-probe samples described under "Chromatographic Procedures". The tests were conducted using a methanol/water eluent (60/40), a flow rate of 1 mL/min and a T$_0$ of 1.68 min. The results for the microspheres shown in Table 1 using the specified test components are shown in FIG. 2.

TABLE 1

| Test | Silica Description | Test Compound |
|---|---|---|
| A | Dehydroxylated microspheres described in Example 1 | 1-Phenylhexane |
| B | Dehydroxylated microspheres described in Example 1 | N,N—Diethylaniline |
| C | Trimethylsilyl-modified microspheres prepared in Example 7 | 1-Phenylhexane |
| D | Trimethylsilyl-modified microspheres prepared in Example 7 | N,N—Diethylaniline |

The results show that with water purge, the retention of the neutral test compound, 1-phenylhexane, as measured by the capacity factor, k', decreased with increasing column volumes of water purged through the column. The decrease in k' for the trimethylsilyl-modified rehydroxylated microspheres prepared in this Example degraded by this procedure was significantly less than that of the starting microspheres. More significantly, the column prepared from the starting microspheres showed an increased retention for the basic probe, N,N-diethylaniline, while the column packing prepared from the microspheres of this Example initially showed decreased retention (indicating less-binding to residual acidic sites initially on the packing), and only a slight increase in k' values with water purge, even with the passage of more than 11,000 column volumes (more than 18,000 mL) of water.

These results show the improved stability of the bonded-phase packing made from the hydroxylated silica of this invention, and the significantly reduced adsorption of basic probes to the packing material, even when a substantial concentration (more than ⅔) of the tritmethylsilyl groups had been hydroxylated from the surface, as measured by the decrease of k' values from the initial point (no water purge).

EXAMPLE 7

Preparation of Porous Silica Microspheres Having a Silanized Surface 10 g of the silanol-enriched microspheres prepared in Example 3 were silanized substantially according to the enolate reaction described in Example 6. The final product exhibited a trimethylsilyl coverage of 3.78 $\mu$mol/m$^2$ as determined by elemental analysis. Capacity factor (k') values for 1-phenylheptane and N,N-diethylaniline were k'$_1$=2.50 and k'$_2$=0.82, respectively, using a chromatographic mobile phase of 60/40 methanol/water. The selectivity factor, k'$_1$/k'$_2$, was 3.05. These chromatographic data indicate low adsorption for the basic solute, N,N-diethylaniline, and normal retention for 1-phenylheptane. Tests with water purging according to a procedure similar to that employed in Example 6 indicated increased stability of the trimethylsilyl group of this hydroxylated silica, as compared to the starting microspheres described in Example 1.

EXAMPLE 8

Preparation of Porous Silica Microspheres Having a Silanized Surface 10 g of the silanol-enriched microspheres prepared in Example 2 were silanized by the enolate reaction in the manner described in Example 6. The final product exhibited a trimethylsilyl concentration of 4.42 $\mu$mol m$^2$/g, as measured by elemental analysis. Using the chromatographic test procedure employing methanol/water in a ratio of 70/30, the capacity factor, k', values of k'$_1$,=7.35 and k'$_2$=1.80 were obtained for 1-phenylheptane and N,N-diethylaniline, respectively, with a selectivity factor, k'$_1$/k'$_2$, of 4.08 in this test. These results indicated reduced absorption of the basic test compound, N,N-diethylaniline, relative to the thermally-dehydroxylated microspheres described in Example 1. Improved stability of this bonded-phase material was also indicated in the water-purge test.

EXAMPLE 9

Figure 3:
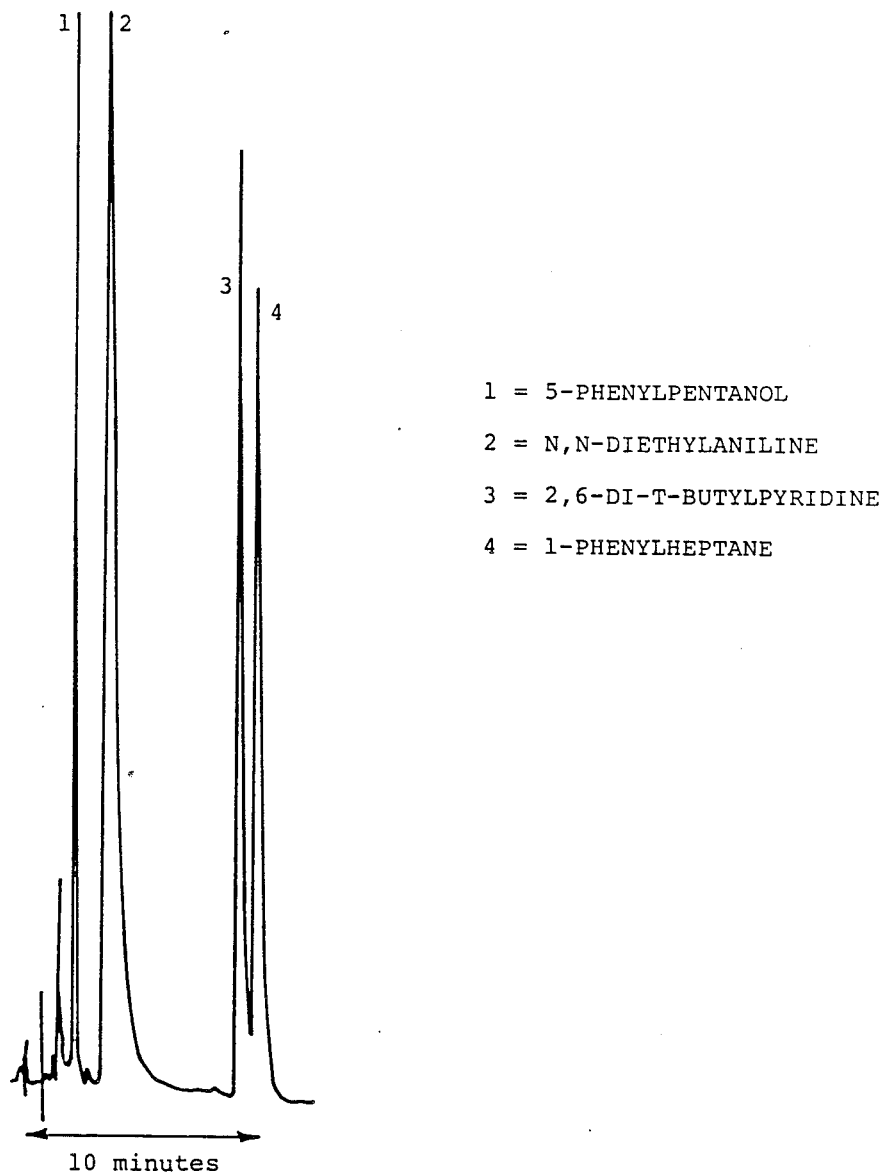
FIG. 3 shows separation of a polarity test mixture on porous silica microspheres having a completely silanized surface.

Preparation of Porous Silica Microspheres Having a Silanized Surface 10 grams of the silanol-enriched microspheres prepared in Example 4 were silanized substantially according to the enolate reaction described in Example 6. The trimethylsilyl group concentration on the resulting silica was 3.89 $\mu$mol/m$^2$, as measured by elemental analysis. Chromatographic tests indicated a low order of adsorption for the basic probe, N,N-diethylaniline. Tests with water purging according to the procedure employed in Example 6 indicated improved stability of the trimethylsilyl bonded-phase material, relative to the starting microspheres described in Example 1. FIG. 3 shows the chromatographic separation of Test Mixture B using a methanol/water eluent (70/30), a flow rate of 1 mL/min, and a pressure of 725 psi (5000 kPa).

EXAMPLE 10

Preparation of Wide-Pore Silica Microspheres Having a Silanized Surface 15 grams of the rehydroxylated microspheres prepared in Example 5 were dried for 30 hours at 200° and 0.1 mbar under an argon atmosphere. The powder was then suspended in a 100 mL of toluene (HPLC-grade) in a 200-mL 3-neck flask fitted with a reflux condenser and an argon purging system. To this mixture was added 250 mL of trimethylchlorosilane and 4.09 g (or 50 μmol) of pyridine (99.9%). This mixture was heated at 120° in an oil bath for 65 hours. The silica was then transferred onto a fine porous frit and washed with 200 mL of toluene, 200 mL of cyclohexane, 200 mL of dichloromethane, 200 mL of methanol, 200 mL of methanol/water, 3:1, and finally, 200 ml acetone. After filtration the powder was dried in a vacuum oven at 120° and 0.1 mbar for 30 hours. This final product had a trimethylsilyl concentration of 3.96 μmol/m², based on elemental analysis.

Figure 4:
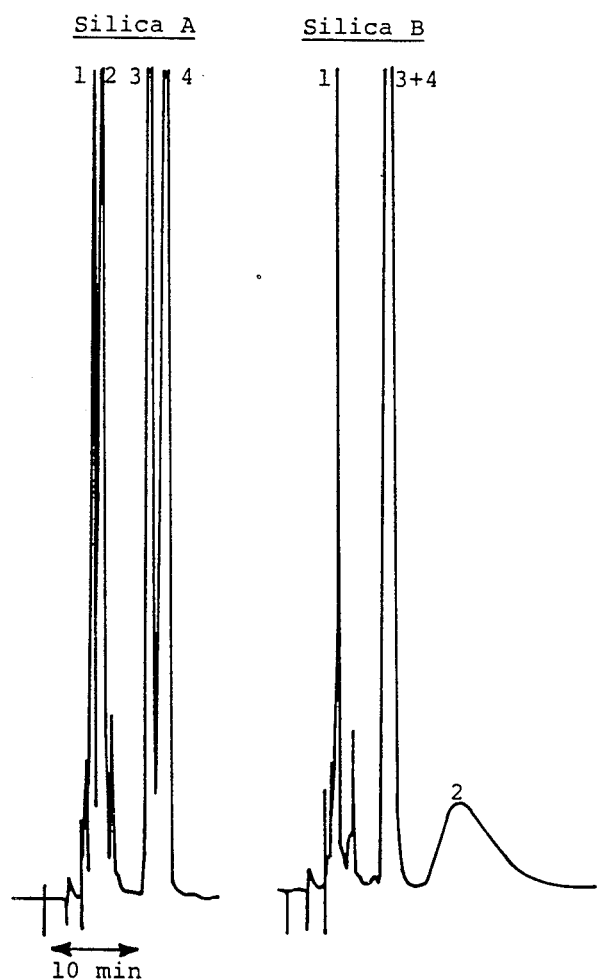
FIG. 4 shows separation of a polarity test mixture on wide-pore porous silica microspheres having a completely silanized surface.

FIG. 4 shows a comparison of chromatographic separations for this product (Silica A) versus a column of the trimethylsilyl-modified microspheres initial starting silica used in Example 5 (Silica B). The tests were conducted using a methanol/water eluent (60/40) at a flow rate of 1 mL/min and pressures of 725 psi (5000 kPa) and 1160 psi (8000 kPa), respectively. The chromatogram for the packing made from the hydroxylated product of this Example shows earlier elution of the basic probe, N,N-diethylaniline, with excellent peak shape, indicating no undesired adsorption of this material. On the other hand, the column of the silanized silica exhibited strong adsorption of N,N-diethylaniline; in addition, N,N-diethylaniline eluted as a very broad tailing peak, indicative of unwanted adsorption. The data in FIG. 4 also indicates strength of the microsphere was improved, as indicated by the lower column back pressure exhibited for this slurry-packed material, relative to the starting silica described in Example 5.

Figure 5:
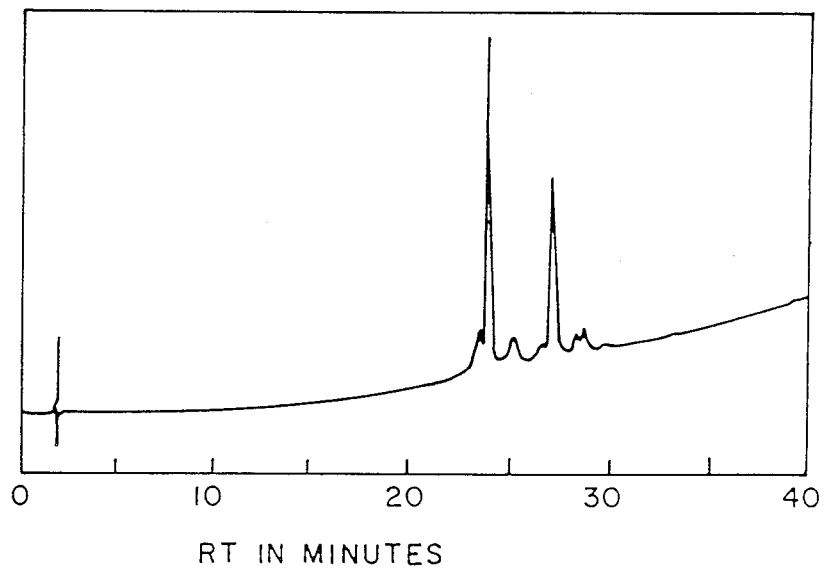
FIG. 5 shows separation of a peptide test mixture containing mellitin on porous silica microspheres having a completely silanized surface.

The efficacy of the chromatographic columns prepared in this Example is further demonstrated in FIG. 5, which shows separation of a mixture containing the basic peptide mellitin (molecular weight=2600; 26 amino acids) on a column of the packing prepared in this example. The separation was conducted with a 60 min gradient starting with 20% acetonitrile in water containing 0.1% trifluoroacetic acid and ending with 100% acetonitrile containing 0.1% trifluoroacetic acid (v/v%). The flow rate was 1.0 mL/min and the temperature was 35°. The results show that all of the compounds are successfully eluted and separated by gradient elution on the silanized microspheres of this Example. Elution of the highly basic peptide, mellitin, could not be achieved when using alkyl bonded-phase columns prepared from silicas that were not fully hydroxylated.

EXAMPLE 11

Crush Resistance of Porous Silicas

A comparision of crush resistance of the porous silicas shown in Table 2 was conducted on an Instron Model 1127 Universal Testing Machine.

TABLE 2

| Test | Silica Description |
|---|---|
| A | Silanol-enriched microspheres prepared in Example 1. |
| B | Heat strengthened thermally-dehydroxylated microspheres described in Example 1. |
| C | Porous silica commercially available from Macherey and Nagel Company Duren, FRG under trademark Nucleosil TM. |
| D | Porous silica commercially available from Separations Group, Hesperia, California under the trademark Vydac TM. |

Figure 6:
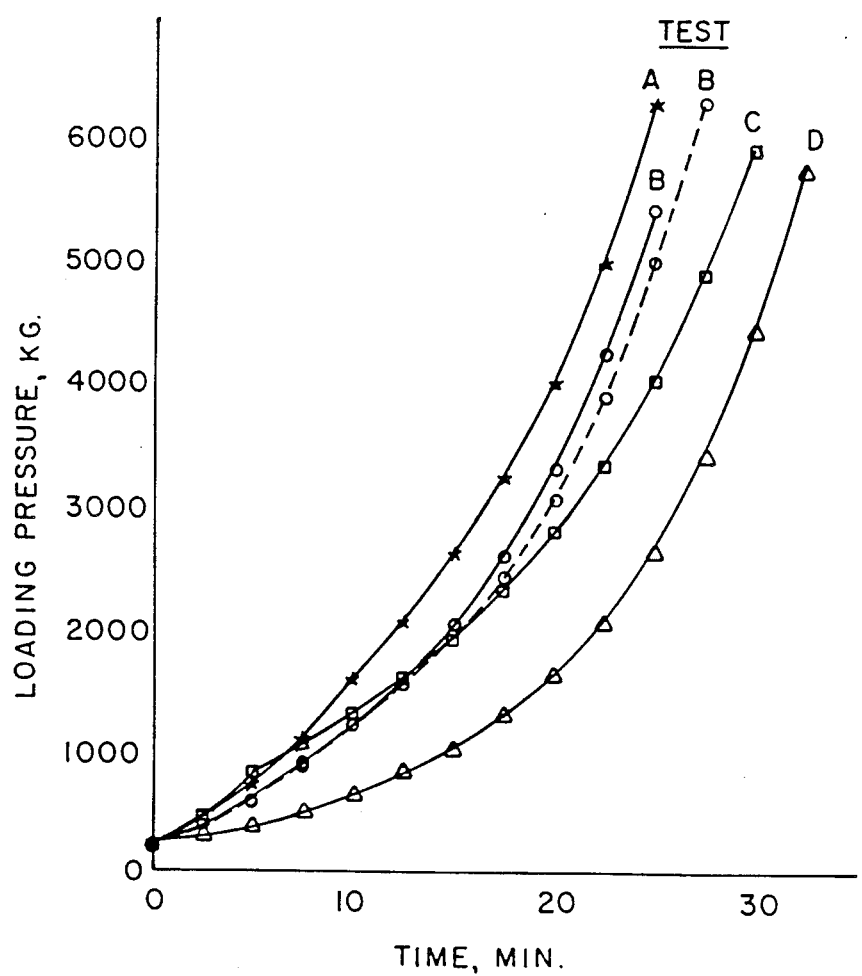
FIG. 6 shows pressure-strength results for specified porous silicas.

Crush resistances for the specified silicas were determined according to the following procedure. One gram of each porous silica was loaded into a stainless steel die normally used for preparing potassium bromide disks for infrared spectroscopy studies. The die had a one-half-inch diameter piston used to form the disks by high-pressure loading. The resulting silica samples were introduced into the die and loaded at a piston travel rate of 0.01 in/min. All samples were initially compacted (or pre-loaded) to a firm homogenous bed with a loading of 250 kg. The samples were then continuously loaded to a total pressure of 14,500 psi ($1.00 \times 10^5$ kPa). The results are shown in FIG. 6. In the FIG. a steep curve represents the ability of stronger particles to readily accept the pressure load; the pressure increases rapidly as crush-resistant particles are loaded. Conversely, a less steep curve indicates that the particles are crushing more readily since the pressure increases more slowly as particles crumble under the load. Data in this curve show that one of the silanol-enriched microspheres prepared in Example 1 showed the highest crush resistance of any silica tested.

The improved crush resistance of the hydroxylated microspheres is believed to be based on the fact that, during the hydroxylation reaction, silica is dissolved and reprecipitated at the points of contact of the colloidal particles making up the aggregate structure. Thus, this fully hydroxylated, reprecipitated silica further binds the colloidal particles together within the aggregate structure, increasing the strength of the microsphere.

What is claimed is:

1. A chromatographic material comprising improved porous silica microspheres having an average diameter of about 0.5 to about 35 μm, substantially all of said microspheres having a diameter ranging from about 0.5 to about 1.5 times said average diameter; said microspheres consisting essentially of a plurality of substantially uniform-size colloidal particles, having a silica surface, arranged in an interconnected three-dimensional lattice; said colloidal particles occupying less than about 50 volume percent of said microspheres with the remaining volume being occupied by interconnected pores having substantially uniform pore size distribution; said microspheres having a total concentration of silanol groups from about 6 to about 16 μmol/m².

2. A chromatographic material as defined in claim 1 wherein the microspheres have an average diameter of from about 1.0 to about 10 μm.

3. A chromatographic material comprising porous silica microspheres having an average diameter of about 0.5 to about 35 μm, substantially all of said microspheres having a diameter ranging from about 0.5 to about 1.5 times said average diameter; said microspheres consisting essentially of a plurality of substantially uniform-size colloidal particles, having a silica surface, arranged in an interconnected three-dimensional lattice; said colloidal parpticles occupying less than about 50 volume percent of said microspheres with the remaining volume being occupied by interconnected pores having substantially uniform pore size distribution; said microspheres having a total concentration of silanol groups from about 8 to about 16 μmol/m², wherein the microspheres are prepared according to a process comprising: contacting heat strengthened thermally-dehydroxylated porous silica microspheres having a surface concentration of silanol groups of less than about 5.5 μmol/m² with water in the presence of HF or at least one basic activator selected from the group consisting of quaternary ammonium hydroxides, ammonium hydroxide, and organic amines at a temperature of from about ambient temperature to about 100° C. for sufficient time to generate the desired concentration of silanol groups of from about 8 to about 16 μmol/m².

4. A chromatographic material as defined in claim 3, wherein the heat strengthened thermally-dehydroxylated porous silica microspheres are contacted with water in the presence of at least one basic activator selected from the group consisting of tetraalkylammonium hydroxides, ammonium hydroxide, primary organic amines, and secondary organic amines.

5. A chromatographic material as defined in claim 4, wherein the basic activator is added in a sufficient amount to generate a pH of from about 9 to about 10.5.

6. A chromatographic material as defined in claim 5, wherein the basic activator is selected from the group consisting of tetraalkylammonium hydroxides, ammonium hydroxide, and primary organic amines.

7. A chromatographic material as defined in claim 6, wherein the basic activator is a primary organic amine selected from the group consisting of ethylenediamine, n-propylamine and n-butylamine.

8. A chromatographic material as defined in claim 6, wherein free HF is present in a concentration of from about 50 to about 400 ppm.

9. A chromatographic material as defined in claim 3, wherein the heat strengthened thermally-dehydroxylated porous silica microspheres are contacted with water in the presence of HF.

10. A chromatographic material comprising improved porous silica microspheres having an average diameter of 0.5 to about 35 μm, substantially all of said microspheres having a diameter ranging from about 0.5 to about 1.5 times said average diameter; said microspheres consisting essentially of a plurality of substantially uniform-size colloidal particles, having a silica surface, arranged in an interconnected three-dimensional lattice; said colloidal particles occupying less than about 50 volume percent of said microspheres with the remaining volume being occupied by interconnected pores having a substantially uniform pore size distribution; said microspheres having a completely silanized surface, wherein the microspheres are prepared according to a process comprising:

(a) contacting heat strengthened thermally-dehydroxylated porous silica microspheres having surface concentration of silanol groups of less than about 5.5 umol/m² with water in the presence of HF or at least one basic activator selected from the group consisting of quaternary ammonium hydroxides, ammonium hydroxide, and organic amines at a temperature of about ambient temperature to about 100° C. for sufficient time to generate a surface concentration of silanol groups of from about 8 to about 16 μmol/m²; and (b) contacting the porous silica microspheres prepared in step (a) with a silanizing agent at a temperature of from about 25° to about 100° C. for sufficient time to generate a completely silanized surface.

11. A chromatographic material as defined in claim 10, wherein the microspheres have an average diameter of from about 1.0 to about 10 μm.

12. A chromatographic material as defined in claim 10, wherein the heat strengthened thermally-dehydroxylated porous silica microspheres are contacted with water in the presence of at least one basic activator selected from the group consisting of tetraalkylammonium hydroxides, ammonium hydroxide, primary organic amines, and secondary organic amines.

13. A chromatographic material as defined in claim 12, wherein the basic activator is added in a sufficient amount to generate a pH of from about 9 to about 10.5.

14. A chromatographic material as defined in claim 13, wherein the basic activator is selected from the group consisting of tetraalkylammonium hydroxides, ammonium hydroxide, and primary organic amines.

15. A chromatographic material as defined in claim 14, wherein the basic activator is a primary organic amine selected from the group consisting of ethylenediamine, n-propylamine and n-butylamine.

16. A chromatographic material as defined in claim 10, wherein the heat strengthened thermally-dehydroxylated porous silica microspheres are contacted with water in the presence of HF.

17. A chromatographic material as defined in claim 16, wherein free HF is present in a concentration of from about 50 to about 400 ppm.

* * * * *

UNITED STATES PATENT AND TRADEMARK OFFICE
CERTIFICATE OF CORRECTION

PATENT NO. : 4,874,518

DATED : October 17, 1989

INVENTOR(S) : Joseph Jack Kirkland and Jurgen Kohler

It is certified that error appears in the above-identified patent and that said Letters Patent is hereby corrected as shown below:

Column 18, line 45, change "6 to about 16" to -- 9 to about 16 --.

Signed and Sealed this

Twenty-eighth Day of January, 1992

*Attest:*

HARRY F. MANBECK, JR.

*Attesting Officer*      *Commissioner of Patents and Trademarks*